No. 673,906. Patented May 14, 1901.
D. V. HOWELL.
FRUIT PICKER.
(Application filed July 7, 1900.)
(No Model.)
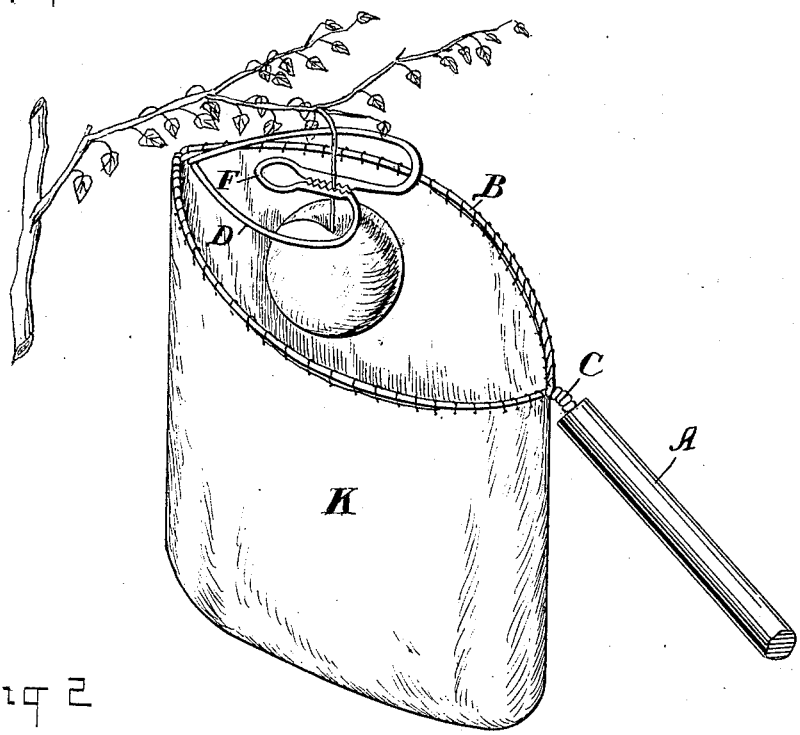
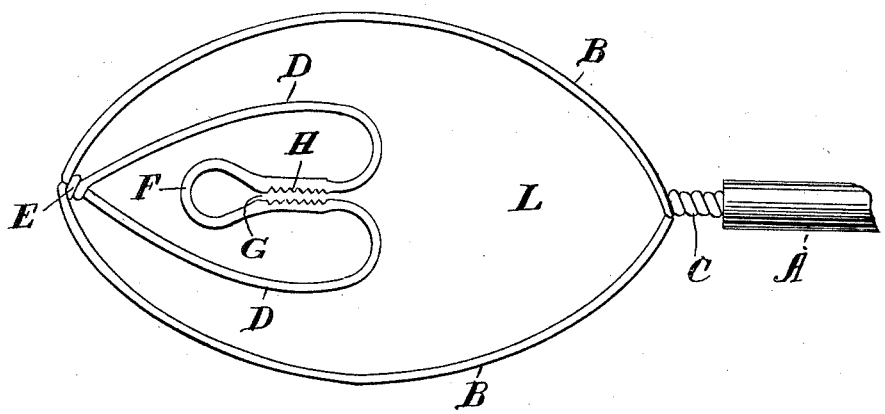
WITNESSES
F. W. Stewart
F. Seeler
INVENTOR
David V. Howell
BY
Edgar Tate
ATTORNEYS
THE NORRIS PETERS CO., PHOTO-LITHO., WASHINGTON, D. C.

UNITED STATES PATENT OFFICE.

DAVID V. HOWELL, OF MONROE, NEW YORK.

FRUIT-PICKER.

SPECIFICATION forming part of Letters Patent No. 673,906, dated May 14, 1901.

Application filed July 7, 1900. Serial No. 22,789. (No model.)

*To all whom it may concern:*

Be it known that I, DAVID V. HOWELL, a citizen of the United States, residing at Monroe, in the county of Orange and State of New York, have invented certain new and useful Improvements in Fruit-Pickers, of which the following is a full and complete specification, such as will enable those skilled in the art to which it appertains to make and use the same.

This invention relates to fruit-pickers; and the object thereof is to provide an improved device of this class which is particularly adapted for use in picking apples, pears, peaches, and all similar fruits.

The invention is fully disclosed in the following specification, of which the accompanying drawings form a part, in which the separate parts of my improvements are designated by the same reference characters in each of the views, and in which—

Figure 1 is a perspective view of my improved fruit-picker complete, a portion of the handle being broken away; and Fig. 2, a plan view of the framework of the device.

In the practice of my invention I provide a fruit-picker comprising a handle A, which may be of any desired length and to one end of which is secured a main frame B, which is preferably composed of a single piece of spring-steel wire bent to form an elliptical body portion, one end of which is connected with the handle A at C and the other end of which is provided with an inwardly and upwardly inclined heart-shaped attachment D, the base of which is at or approximately at or over the middle of the main frame B and the apex of which is connected with the main frame B at the end opposite the handle E. The sides of the heart-shaped attachment D at the base of said attachment are curved inwardly and backwardly to form a loop F, the sides of which are brought approximately together, as shown at G, and provided with cutting edges, preferably in the form of serrations H, and the loop F is preferably curved downwardly and backwardly, as shown in Figs. 1 and 2; but the shape of these parts may be modified within certain limits without departing from the spirit of my invention or sacrificing its advantages.

In forming the main frame B and the parts D and F the wire from which said parts are made is bent centrally to form a loop F and then to form the part D, the separate sides of which are twisted together at E, then separated to form the main frame B, and then connected and twisted together to form the shank C, by means of which connection with the handle A is made. A sack K (shown in Fig. 1) is then connected with the main frame in any desired manner, preferably by stitching, and said sack may be of any desired size and of a suitable depth to serve the purpose for which it is intended.

In picking fruit the device is manipulated by means of the handle A so as to pass the fruit or separate specimens thereof down into the sack through the open space L, (shown in Fig. 2,) and the device is then manipulated so as to bring the stem of the fruit between the sides of the loop F, by means of which the stem is cut and the fruit drops into the bag or sack K.

By forming the device of wire in the manner described the sides of the loop F, which form the cutter, are given a spring action and are capable of being slightly expanded, and this facilitates the operation of the device in cutting off the stems of the fruit, and if a limb or twig be caught it would pass backwardly between the cutters, which will separate to admit of this operation.

Having fully described my invention, I claim as new and desire to secure by Letters Patent—

A fruit-picker composed of a single wire bent to form an oblong frame which is adapted at one end to be connected with a handle, and provided at the other end with a member which projects over said frame, said member being heart-shaped in form and being composed of spring sides curved outwardly and inwardly, and then curved backwardly between said sides to form spring cutting devices having inwardly-directed cutting edges, the rear portions of said cutting devices being connected, and said cutting edges being closely adjacent, substantially as shown and described.

In testimony that I claim the foregoing as my invention I have signed my name, in presence of the subscribing witnesses, this 6th day of July, 1900.

DAVID V. HOWELL.

Witnesses:
F. A. STEWART,
C. C. OLSEN.